United States Patent [19]
Gross

[11] 4,132,984
[45] Jan. 2, 1979

[54] LIQUID CRYSTAL DISPLAY
[75] Inventor: Gerald G. Gross, Solon, Ohio
[73] Assignee: Liquid Xtal Displays Inc., Cleveland, Ohio
[21] Appl. No.: 688,399
[22] Filed: May 20, 1976
[51] Int. Cl.² .............................................. G09F 9/32
[52] U.S. Cl. .................................... 350/336; 361/397; 340/146.3 A
[58] Field of Search ............. 340/324 M, 336; 178/30; 350/160 LC, 334, 336

[56] References Cited
U.S. PATENT DOCUMENTS

| 3,668,688 | 6/1972 | Schmersal | 340/324 M |
| 3,753,038 | 8/1973 | Liddle | 340/324 M |
| 3,760,403 | 9/1973 | Kippenhan | 178/30 |
| 3,868,676 | 2/1975 | Hennessey et al. | 340/324 M |
| 4,025,162 | 5/1977 | Yagi | 350/160 LC |

Primary Examiner—Marshall M. Curtis
Attorney, Agent, or Firm—Olson, Trexler, Wolters, Bushnell & Fosse, Ltd.

[57] ABSTRACT

A liquid crystal display is provided with separate groups of leads extending to opposite margins and a plurality of individual terminal clips or elements preassembled with and permanently secured to the leads for facilitating assembly of the display in an end product such as a clock, meter or other instrument.

2 Claims, 3 Drawing Figures

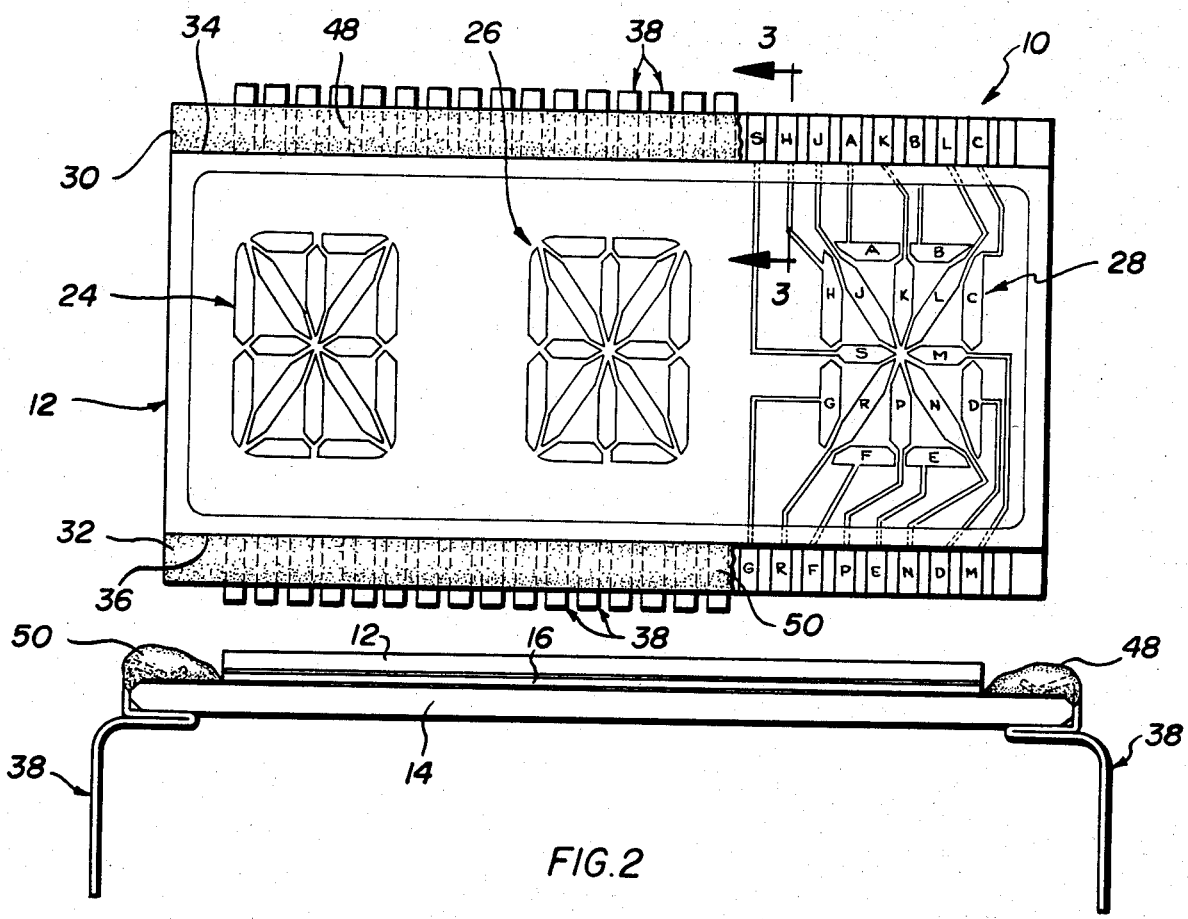
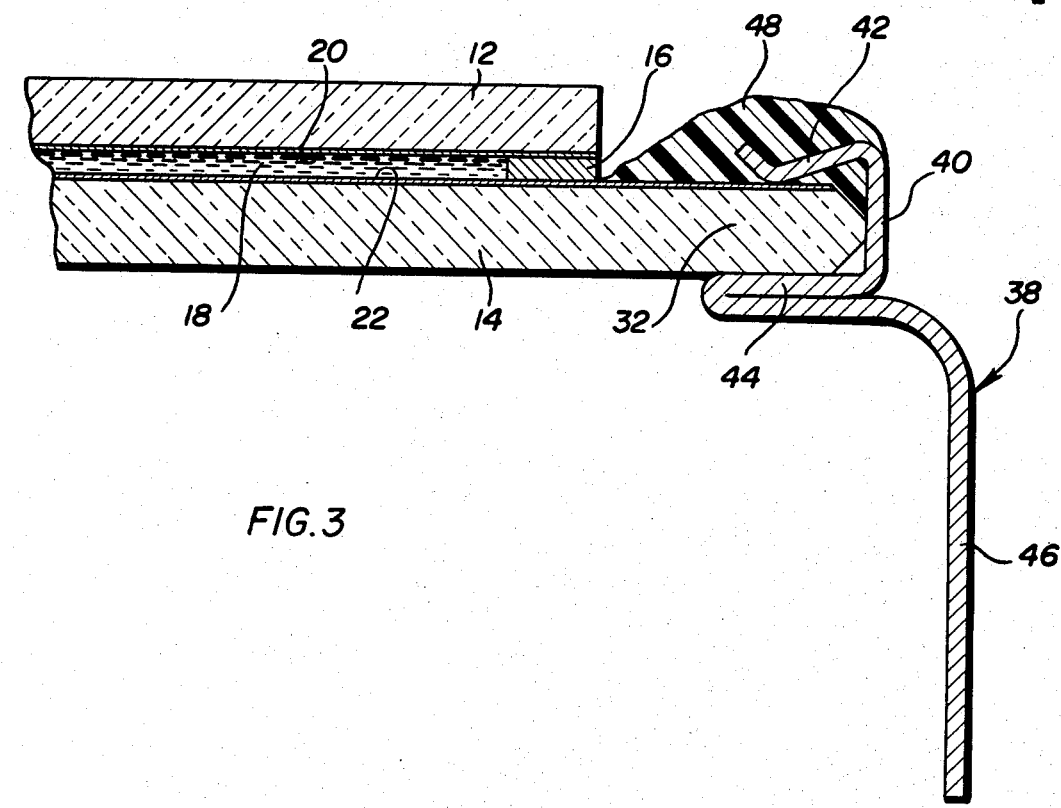

LIQUID CRYSTAL DISPLAY

BACKGROUND OF THE INVENTION

The present invention relates to a novel readout or display device, and more specifically to a novel liquid crystal display.

While devices of the type contemplated herein may be incorporated into many end products, certain features of the present invention are especially suitable for relatively large liquid crystal display devices adapted for assembly in equipment such as clocks, watches, timers, marine electronics, agricultural instruments and controls, medical electronics, and other industrial, automotive and aircraft instruments and controls. In general, such relatively large liquid crystal display units have frequently included several digits or characters each made up of many different segments requiring a large number of closely spaced leads. One general practice has been to arrange all of such leads to that they are presented along a common edge of the display which is subsequently inserted into an edge connector assembly in the ultimate instrument or other package. Difficulties have sometimes been encountered in obtaining a satisfactory assembly with such edge connector arrangements and problems have sometimes been encountered in arranging all of such leads along a common margin of the device.

SUMMARY OF THE INVENTION

It is an object of the present invention to provide a novel liquid crystal display constructed so as to facilitate assembly into the final instrument or package and also so as to facilitate manufacture with the leads satisfactorily spaced and insulated from each other.

A more specific object of the present invention is to provide a novel liquid crystal display having groups of a plurality of leads arranged for projecting from different portions of the display so as to facilitate formation and separation of the leads, said display further including terminal elements respectively fixed to the leads for facilitating assembly of the display with an instrument or other package.

A still further specific object of the present invention is to provide a novel liquid crystal display having groups of a plurality of leads extending adjacent spaced margins of the display and further including a plurality of terminal elements or clips formed to permit rapid and economical assembly with such margins of the display and electrical connection with the leads for facilitating subsequent installation of the display in an instrument or the like.

In accordance with one form of the present invention, a liquid crystal display is provided having a glass front plane overlying a glass back plane with liquid crystal compound therebetween, said back plane having opposite marginal portions projecting laterally beyond opposite adjacent edges of the front plane and a plurality of leads on and spaced along each of the outwardly extending opposite margins of the back plane, a plurality of terminal elements or clips secured to said opposite marginal portions of the back plane and respectively electrically connected to the leads, means permanently securing such terminal elements with respect to the leads and the back plane, and the terminal elements being formed so as to be substantially entirely beneath the upwardly exposed surface of the front plane for avoiding interference with any adjacent part of an instrument or other package into which the display is assembled.

Other objects and advantages of the present invention will become apparent from the following description and the accompanying drawings wherein:

FIG. 1 is a plan view partially broken away showing a liquid crystal display incorporating features of the present invention;

FIG. 2 is an end view of the display shown in FIG. 1; and

FIG. 3 is an enlarged fragmentary sectional view taken along line 3—3 in FIG. 1 and showing a portion of the structure in greater detail.

Referring now more specifically to the drawings wherein like parts are designated by the same numerals throughout the various figures, a liquid crystal display 10 incorporating features of the present invention comprises a front glass member or plane 12 and a back glass member or plane 14. The members 12 and 14 are spaced apart by an annular gasket or spacer 16 and permanently fixed and sealed with respect to each other in a known manner. A film or body 18 of liquid crystal compound, also of known composition, is disposed between the front and back planes.

Cooperable electrode means generally designated by the numerals 20 and 22 are provided on the confronting surfaces of the back and front planes. These electrodes are preferably formed from any suitable substantially transparent electrode material such as indium oxide in a known manner. Also, as will be understood, the electrode means 22 on the back plane is etched to provide a plurality of segments for a plurality of display characters respectively generally indicated by the numerals 24, 26 and 28.

Referring particularly to FIG. 1, it is seen that the character 28 is made up of a plurality of segments A, B, C, D, E, F, G, H, J, K, L, M, N, P, R, S which are separate and electrically insulated from each other. These segments are respectively connected by separate and electrially insulated leads bearing corresponding letters in FIG. 1.

It is to be noted, that the back member or plane 14 is somewhat larger than the front plane and includes opposite marginal portions 30 and 32 which extend substantially laterally beyond adjacent opposite edges 34 and 36 of the top member or plane 12. The arrangement of the previously mentioned leads is such that a first group of the leads extends over the exposed marginal portion 30 of the back member or plane and a second group of the leads extends in the opposite direction over the exposed marginal portion 32. In the embodiment shown, approximately half of the leads (leads A, B, C, H, J, K, L, S) extend across and are spaced along the marginal portion 30 and the remaining leads extend across and are spaced along the marginal portion 32. With this arrangement, the individual leads may be more easily and reliably formed and insulated from each other than would be the case where all of the leads are arranged to extend to the same edge of the display. While the foregoing description of the individual segments and leads has been given for the character 28, it is understood that the remaining characters of the display will be provided with similar segments and leads. In other words, while a variety of different characters made up of different numbers and arrangement of segments may be provided, it is contemplated that the construction will be such that congestion of the leads will be minimized by an arrangement whereby one portion of the leads extends over the margin 30 of the back member while that other portion of leads extends over the marginal portion 32.

It is further to be noted that in order to facilitate handling of the display and ultimate assembly in an instrument or other package, terminal or clip elements 38 are provided. More specifically, each terminal or clip element includes an attachment portion 40 having opposed legs or prongs 42 and 44 adapted to be slipped over the margin of the back member or plane for mechanically gripping the back member and making electrical contact with one of the leads. A prong 46 extends from the attachment portion for interconnection with a complimentary wire, socket or other connector means in an instrument or package. The prong 46 may be arranged to extend transversely of the plane of the liquid crystal as shown in the drawings or, if desired, it may be arranged to extend generally parallel to the plane of the liquid crystal. Furthermore, the attachment portion 40 of the terminal element or clip may be provided with a variety of suitable configurations. In each instance, however, the attachment portion is formed so as to avoid projecting above or beyond the upper surface of the top member 12 whereby to minimize any possibility of interference with surrounding portions of an instrument or the like, not shown, with which the display is to be assembled.

As previously indicated, the clips 38 may be of various specific structures or configurations. However, the clips are preferably initially formed and provided in a continuous strip wherein end portions 46 of adjacent clips are integrally connected in a known manner (not shown). Automatic machinery of known construction is available for handling such strips of clips and economically and accurately applying the clips to the marginal portions 30 and 32 and the leads thereon. The previously mentioned spacing of the leads insures proper spacing and separation of adjacent clips. Of course, the connecting strip between adjacent clips is severed during the assembly operation.

Means is provided for permanently securing the clips or terminal elements 38 to the marginal portions 30 and 32 and the leads thereon. Thus, the integrity of the entire liquid crystal display is assured and handling or assembly of individual clips by a workman installing the display in an instrument or other package is eliminated. In other words, the structure of the present invention eliminates the possibility that a workman assembling the display in an instrument will fail to apply one of the clips properly or will scratch or otherwise damage the leads in attempting to apply the clips to the margins 30 and 32. The structure further eliminates material handling and inventory problems which would be present if clips or terminal elements were provided separately from the display. In the embodiment shown, the clips or terminal elements are permanently secured to the the back member 12 by means of coatings or bodies 48 and 50 of suitable adhesive and protective material such as epoxy. In this embodiment, the bodies 48 and 50 are preferably applied over the upper leg portions 42 of the clip or terminal elements and also substantially cover or enclose the otherwise exposed portions of the leads on the margins 30 and 32 of the back plane or member 14. It is to be understood, however, that, in certain installations, other securing or attaching means may be successfully used such, for example, as soldered connections between the leg portions 42 and their associated leads.

While a preferred embodiment of the present invention has been shown and described herein, it is obvious that many structural details may be changed without departing from the spirit and scope of the appended claims.

The invention is claimed as follows:

1. A liquid crystal display device comprising a back plane member, a front plane member overlying said back plane member, a body of liquid crystal compound confined between said front and back members, one of said members including first and second spaced marginal portions respectively projecting laterally outwardly in different directions from adjacent margins of the other of said members, a plurality of electrode strips of thin substantially transparent conducting material such as indium oxide on said one of said members respectively including first portions between said members arranged in a predetermined pattern for providing a desired display, certain of said strips including lead portions extending on said first marginal portion of said one member, other of said strips including lead portions extending on said second marginal portion of said one member, a plurality of separate contact elements respectively electrically connected to said lead portions each of said contact elements including an attachment portion comprising opposed legs mechanically firmly gripping said one member therebetween with one of said legs in electrical contact with a lead portion, the mechanical gripping of said legs providing substantially the only means maintaining said electrical contact, and bodies of adhesive coating material over said first and second marginal portions and permanently securing each of said contact elements with respect to said one member, each of said contact elements including a portion projecting from said one member for electrical connection with complemenatry circuit means.

2. A liquid crystal display device, as defined in claim 1, wherein said one of said members is said back member and said front plane member has a predetermined thickness said attachment portions of the contact elements being wholly disposed beneath an imaginary projecting plane of the upper surface of said front member.

* * * * *